United States Patent [19]

Davis

[11] 4,159,951

[45] Jul. 3, 1979

[54] SECTOR ASSEMBLY

[75] Inventor: Steven S. Davis, Bountiful, Utah

[73] Assignee: Envirotech Corporation, Menlo Park, Calif.

[21] Appl. No.: 872,123

[22] Filed: Jan. 25, 1978

[51] Int. Cl.² .............................................. B01D 25/04
[52] U.S. Cl. ..................................... 210/331; 210/345
[58] Field of Search ............... 210/232, 331, 345, 347, 210/380, 486; 29/163.5, 526

[56] References Cited

U.S. PATENT DOCUMENTS

| | | | |
|---|---|---|---|
| 1,538,980 | 5/1925 | Gemter | 210/345 X |
| 2,591,720 | 4/1952 | Peterson | 210/345 X |
| 2,885,083 | 5/1959 | Peterson et al. | 210/331 X |
| 3,291,312 | 12/1966 | Peterson | 210/345 |
| 3,485,376 | 12/1969 | Peterson et al. | 210/331 |
| 3,491,886 | 1/1970 | Glos et al. | 210/331 |
| 3,643,803 | 2/1972 | Glos | 210/331 |
| 3,692,181 | 9/1972 | Davis | 210/331 |

*Primary Examiner*—Theodore A. Granger
*Attorney, Agent, or Firm*—John J. Morrissey; Robert E. Krebs

[57] ABSTRACT

A sector assembly for disc filters including an improved sector body, an improved bell member and two sector rods which extend along respective radial sides of the sector body and of the bell member to secure the sector body to the bell member. Each radial side of the sector body being formed to define a concave channel and formed to define within the channel a concave slot. Each radial side of the bell member being formed to define a concave channel and formed to define a passage inward of the channel. The slots and passages being dimensioned to allow the respective sector rod to extend therein.

9 Claims, 10 Drawing Figures

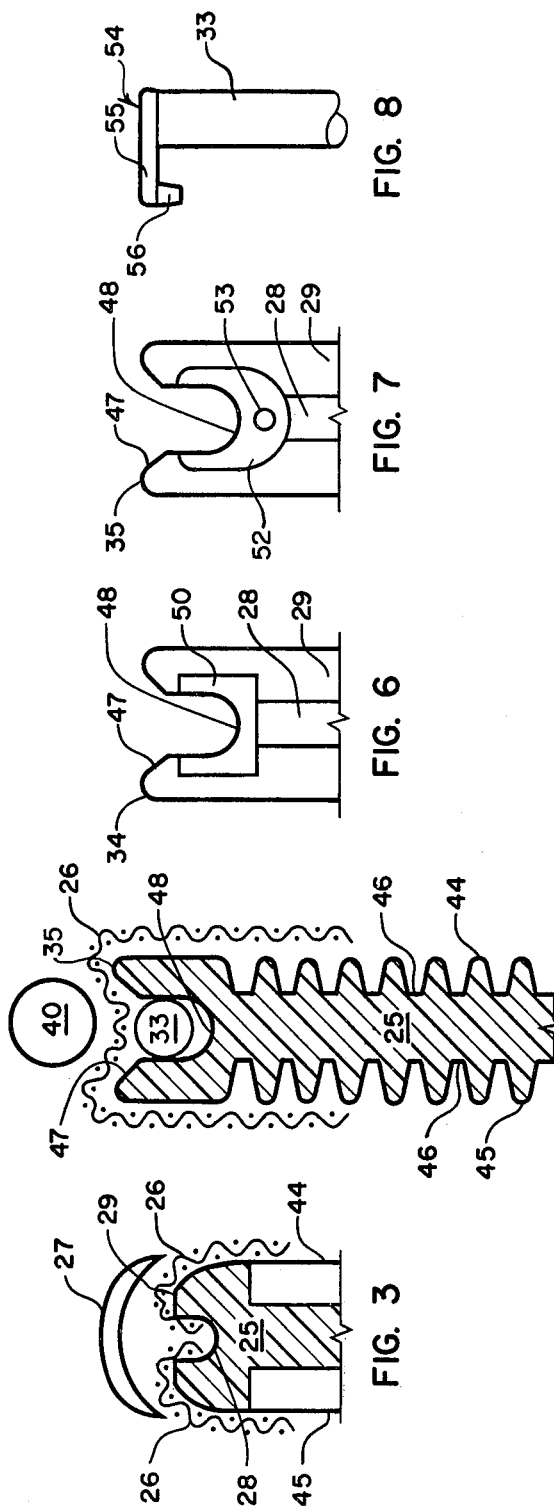

SECTOR ASSEMBLY

BACKGROUND

This invention relates to an improved sector assembly for a rotary disc vacuum filter.

Disc filters are well known in the filtration art. A typical disc filter includes a series of generally fan-shaped filter sector assemblies secured at close intervals around a rotatable supportive shaft. Each sector assembly includes a fan-shaped sector body and a bell-shaped conduit or member connecting the body to the shaft. Each sector body is covered individually with a filter medium to provide filtering on opposing faces of the body. The faces of the sector body are typically provided with grooves which are interconnected by the bell member to a conduit formed in the supporting shaft through which a vacuum is drawn to draw liquid filtered through the filter medium.

Various filter sector assemblies are known in the art, for example wooden sector assemblies, plastic sector assemblies and combinations thereof. Of these, plastic sector assemblies are particularly desirable due to their resistance to corrosive materials and to their comparative lightness in weight which eases handling. However, these plastic sector assemblies present a challenge in the form of providing sufficient structural strength to the assembly to prevent buckling of the assembly, for example along the connection of the sector body to the bell-shaped conduit.

U.S. Pat. Nos. 3,917,534 and 3,485,376 teach plastic sector assemblies. In U.S. Pat. No. 3,917,534, structural strength is provided to the assembly by forming a plastic sector body with a hollow interior which is filled with a second plastic material. A further technique taught by this patent for providing strength is molding the plastic body around metal rods which extend internally through the body of the sector and are employed to secure the body to a bell member.

In U.S. Pat. No. 3,485,376, structural strength is provided by forming a sector body with a plurality of intermediate sections. These intermediate sections are then secured together to form the body with structural pieces which circumscribe the body. The structural pieces extending along the radial sides of the body impede replacement of a filter medium overlying the body by being positioned outside the filter medium.

OBJECTS OF THE INVENTION

An object of this invention is to provide an improved sector body and bell member for a sector assembly of a rotary disc vacuum filter allowing simple assembly and disassembly of the body and bell member.

Another object is to provide a sector assembly having sufficient structural strength to allow the sector body to be made of plastic. Still another object is to provide a sector assembly in which the filter medium employed is easily replaced.

BRIEF DESCRIPTION OF THE DRAWINGS

Further objects and advantages of the invention may be readily ascertained by reference to the following description and appended drawings, which are offered by way of description only and not in limitation of the invention, the scope of which is defined in the appended claims.

In the drawings:

FIG. 3 is a sectional view drawn to an enlarged scale taken along lines 3—3 of FIG. 1 with the component parts shown in an exploded arrangement;

FIG. 4 is a sectional view drawn to an enlarged scale taken along lines 4—4 of the FIG. 2 with the components shown in an exploded arrangement;

FIG. 5 is a sectional view drawn to an enlarged scale taken along lines 5—5 of FIG. 1;

FIG. 6 is a sectional view drawn to an enlarged scale taken along lines 6—6 of FIG. 2;

FIG. 7 is a sectional view drawn to an enlarged scale taken along lines 7—7 of FIG. 2;

FIG. 8 is a sectional side view drawn to an enlarged scale taken along lines 8—8 of FIG. 2;

PREFERRED EMBODIMENT OF THE INVENTION

Figure 1:
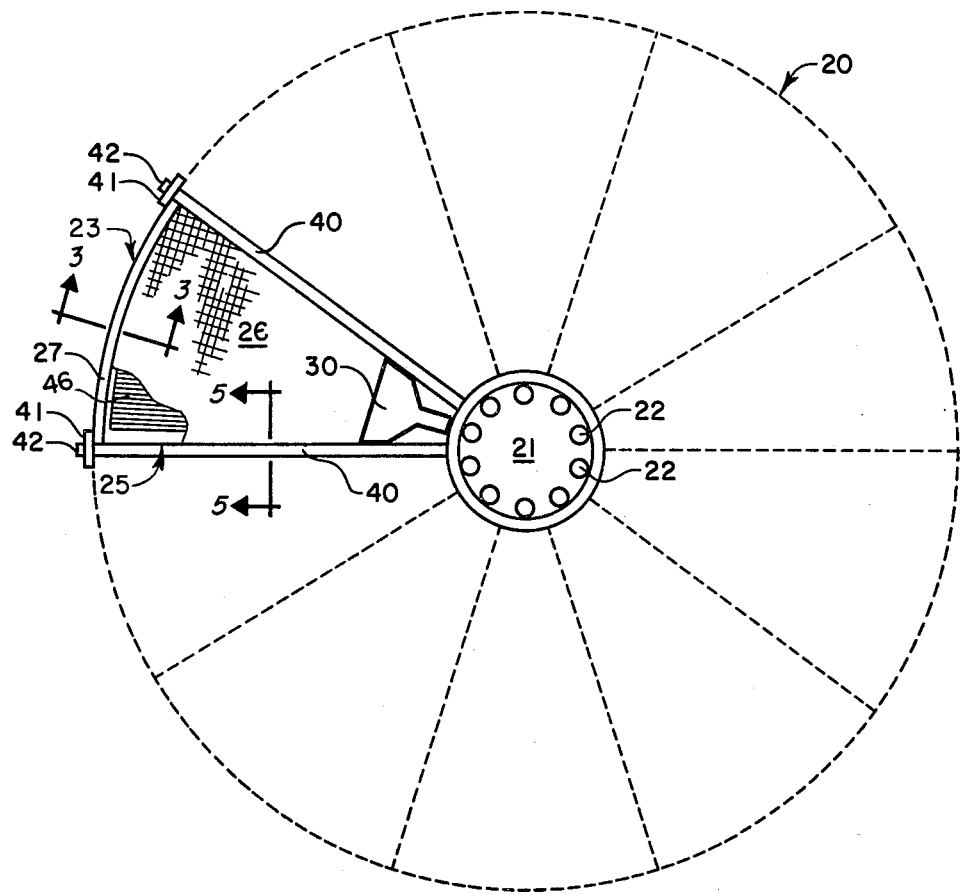
FIG. 1 is a partial side elevation showing schematically an arrangement of one sector assembly and its positioning on a rotary shaft with adjoining similar sector assemblies shown in broken lines to form a disc filter.

As shown in FIG. 1, a disc filter 20 represented by dashed lines has a central shaft 21 which can be of any well known type providing connection of valve controlled conduits 22 to individual sector assemblies 23, one of the assemblies 23 has been represented by the full line representation in FIG. 1. The other segments of the representation of disc filter 20 shown in FIG. 1 are corresponding sector assemblies.

The assembly 23 includes a plastic media-support and drainage body 25 (shown by a cutaway in FIG. 1 and in FIG. 2) and a filter medium 26 which is supported by and overlies the body 25. A peripheral piece 27 is employed to secure edges of the filter medium 26 along a medium groove 28 which is defined by an outer end portion 29 of the body 25 (best seen in FIG. 3). The assembly 23 further includes a plastic bell member 30 to which an inner end portion 31 (FIG. 4) of the body 25 is detachably secured in flow communication. Metal sector rods 32 and 33, shown in FIG. 2, extend along opposite radial sides 34 and 35 of the body 25 and are employed to detachably secure the bell member 30 to the body 25.

Figure 2:
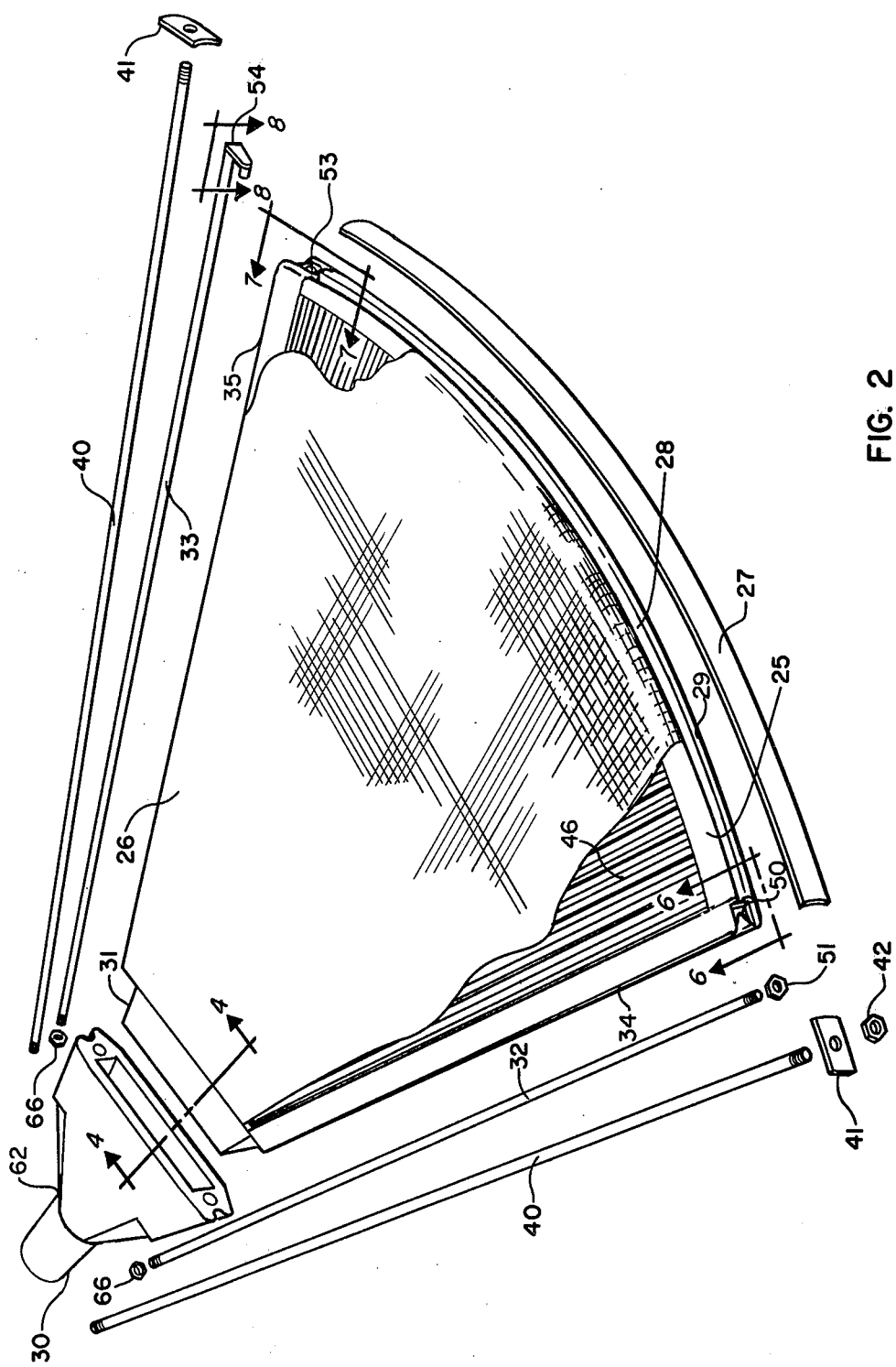
FIG. 2 is a perspective view of the sector assembly shown in FIG. 1 with the component parts shown in an exploded arrangement and having all but a portion of the filter medium removed.

Further, as shown in FIG. 1, metal radial rods 40 align and secure the sector assemblies 23 to the central shaft 21. The radial rods 40 are secured to the central shaft 21 and extend radially outward between sides of adjoining assemblies 23 to the periphery of the assemblies 23. At the periphery an arcuate piece 41, best seen in the exploded arrangement of FIG. 2, is secured to each radial rod 40 to extend along the periphery of the disc filter 20 in both directions from its respective radial rod 40. Each arcuate piece 41 is drawn inward against two adjoining peripheral pieces 27 by the tightening of a nut 42 on its corresponding radial rod 40.

Describing the sector body 25 in more detail, the outer end portion 29 is of greater width than the inner end portion 31. The body 25, as shown in FIGS. 2 and 5, has a face 44 and an opposite face 45. The faces 44 and 45 are generally parallel and have similar grooves 46 formed therein to accomodate flow of filtrate during filter operation. The first and second radial sides 34 and 35 of the body 25 extend linearly from the inner end portion 31 to the outer end portion 29. The first side 34 as shown in FIG. 5, similarly the second side 35, is formed to define a shallow concave arcuate channel 47 and formed to define within the channel 47 a deep concave slot 48 inward from the channel 47 having parallel walls and an arcuate bottom. The channel 47 and slot 48 on each side extend lengthwise from adjacent the inner end portion 31 along a substantial length of each side sufficient to prevent buckling along inner end portion 31; preferably they extend to the outer end portion 29. The channel 47 and slot 48 are dimensional so that the sector rods 32 and 33 are received to extend in the slots 48 enclosed by the filter medium 26 side-by-side adjacent the radial rods 40 which are received to extend along the channels 47 outside the filter medium 26.

Along each of the sides 34 and 35 of the body 25 at an outer end of the slot, preferably at the outer end portion 29, a seat is formed for the sector rods 32 and 33. As shown in FIG. 6, a seat 50 is formed on the side 34 by a rim about the slot 48 defining a face normal to the slot 48. The seat 50 is suitable for radial rod 32 which has a nut 51 (FIG. 2) threaded thereon or which alternatively includes a bolt head. As shown in FIG. 7, an alternative seat 52 is formed on the side 35 with a socket 53. This alternative seat 52 is suitable for radial rod 33 (FIG. 8) which has a head 54 including an arm 55 with a pin 56 which extends from the arm 55 and is inserted in the socket 53. The seats 50 and 52 are formed inward of and recessed from the periphery of the outer end portion 29 so that the heads of the radial rods 32 and 33 do not interfere with the overlying of the filter medium 26 or with the positioning of the peripheral piece 27.

Figure 9:
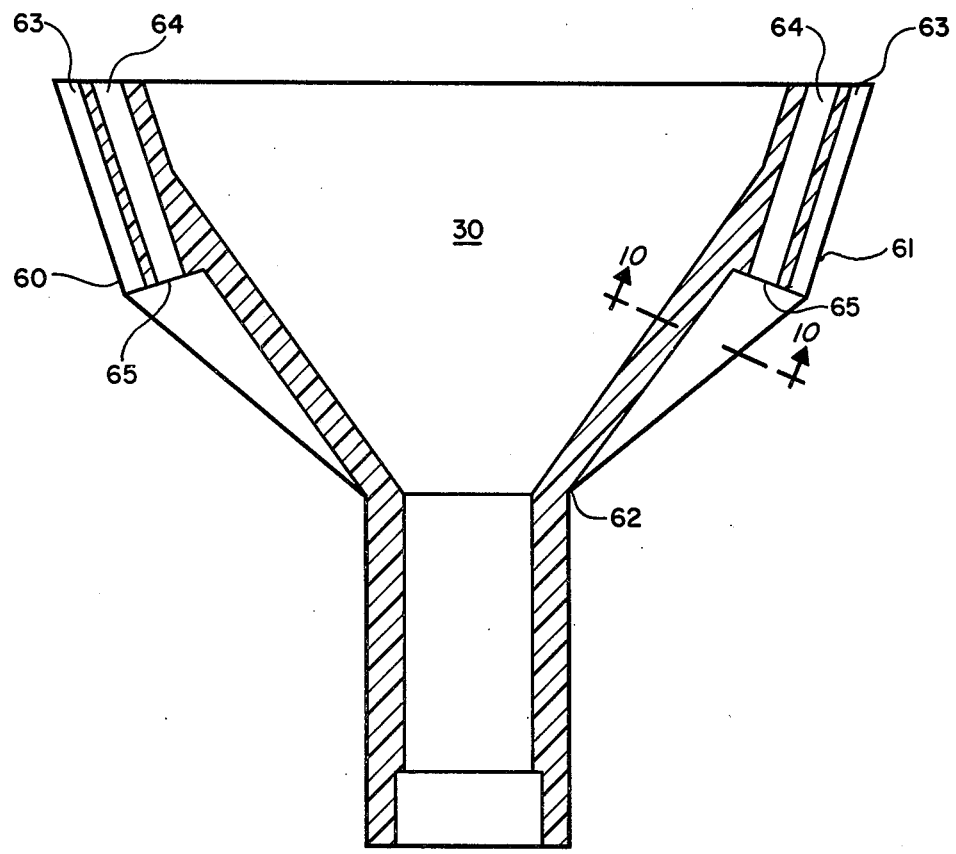
FIG. 9 is a sectional view to an enlarged scale of the bell member shown in FIG. 1.
Figure 10:
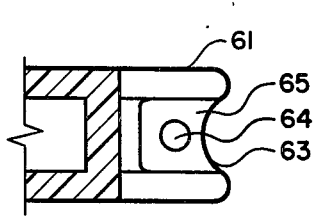
FIG. 10 is a sectional view taken along lines 10—10 of FIG. 9.

As shown in more detail in FIGS. 9 and 10 the bell member 30 has first and second linear radial sides 60 and 61 and a neck 62. Each side 60 and 61 is formed to define a shallow concave arcuate channel 63 and formed on to define, inward of the channel 63, a cylindrical passage 64. The channel 63 and passage 64 formed each side extend lengthwise along the sides 60 and 61. The channels 63 and passages 64 are dimensioned so that the sector rods 32 and 33 are received to extend in the passages 64 side-by-side adjacent the radial rods which are received to extend along the channels 63.

Further each side 60 and 61 of the bell member 30 is formed to define at an inner end of the passage 64 a seat 65 against which the sector rods 32 and 33 can be tensioned with a nut 66 (FIG. 3) threaded on the sector rods 32 and 33. As an alternative to employing nuts 66, the end of each sector rod 32 and 33 can be tapped and a tap screw employed. Each seat 65 is formed by a rim about the passage 64 defining a face normal to the passage 64. The seats 65 are formed inward of and recessed from the periphery of the sides 60 and 61 so that the radial rods 40 can be positioned such that the filter medium 26 can be drawn on to the body 25 over the bell member 30 without interference with the sector rods 32 and 33 and can be secured along an edge about the neck 62 of the bell member 30 without interference.

As is apparent from the above description, the present invention provides a number of advantages over previous sector assemblies. The described sector body 25 and bell member 30 can be simply assembled and disassembled by screwing on and off nuts 66 to and from the sector rods 32 and 33. Further, the sector assembly 23 permits the interchange of sector bodies 25 according to the requirement of a given operation without changing the bell member 30 or the sector rods 32 and 33. Even further the sector rods 32 and 33 prevent buckling of the assembly 23. Consequently, the sector body 25 can be molded from plastic without the need to mold the body 25 to have a hollow interior to be filled with a second material or to mold rods into the interior of the body.

I claim:

1. In a rotary disc vacuum filter of the type having a disc filter which includes a series of fan-shaped filter sector assemblies secured at intervals around a rotatable supporting shaft, each assembly including a fan-shaped sector body covered with a filter medium to provide filtering on opposing faces of the body and a bell member interconnecting passageways of the body with a conduit formed in the supporting shaft and through which a vacuum is drawn to draw liquid filtered through the filter medium along the passageways and through the bell member to the conduit, as a new article of manufacture, a sector comprising a body of generally fan-shaped configuration having two opposed faces which have grooves formed therein for filtrate drainage, said body further having two radially extending sides, each side having a concave channel formed therein along which a radial rod securing said body to a supporting shaft extends and formed within said channel a concave slot along which a sector rod securing said body to a bell member extends; said channel and slot on each radial side of said body being formed to extend lengthwise along said sides.

2. A sector according to claim 1 wherein said channel is dimensioned to receive a first rod and said slot is dimensioned to receive a second rod so that the rods extend side-by-side.

3. A sector according to claim 1 wherein each side has a seat formed at an end of said slot.

4. In a rotary disc vacuum filter of the type having a disc filter which includes a series of fan-shaped filter sector assemblies secured at intervals around a rotatable supporting shaft, each assembly including a fan-shaped sector body covered with a filter medium to provide filtering on opposing faces of the body and a bell member interconnecting passageways of the body with a conduit formed in the supporting shaft and through which a vacuum is drawn to draw liquid filtered through the filter medium along the passageways and through the bell member to the conduit, a sector assembly comprising:
   a. a media-supporting body having an outer end portion, an inner end portion, two opposed faces, and first and second sides;
      i. said outer end portion having a greater width than said inner end portion;
      ii. said opposed faces being generally parallel to one another and having grooves formed therein to accommodate flow of filtrate during filter operation; and
      iii. said first and second sides being formed to extend from said inner end portion to said outer end portion, each of said sides defining a concave channel and a concave slot within said channel along which channel a radial rod securing said body to a supporting shaft extends and along which slot a sector rod securing said body to a bell member extends, said channel and said slot on each side extending lengthwise a substantial length of the side; and b. a bell member mounted in flow communication to said inner end portion and having first and second radial sides, each of said sides being formed to define a concave channel along which the respective radial rod extends, a passage inward of said channel along which the respective sector rod extends and a seat at an end of said passage, said channel and said passage on each side extending lengthwise along the side.

5. A sector assembly according to claim 4 wherein each of said sides of said body includes a seat formed at the end of the slot and further including first and second sector rods for securing said body to said bell member extending along respective first and second sides of said body in said slots from said seats of said bell member to said seats of said body.

6. A sector assembly according to claim 5 further including a filter medium overlying said body and enclosing said sector rods along said sides of said body.

7. In a rotary disc vacuum filter apparatus of the type having a disc filter which includes a series of fan-shaped filter sector assemblies secured at intervals around a rotatable supporting shaft, each assembly including a fan-shaped sector body covered with a filter medium to provide filtering on opposing faces of the sector body and a bell member interconnecting passageways of the sector body with a conduit formed in the supporting shaft and through which a vacuum is drawn to draw liquid filtered through the filter medium along the passageways and through the bell member to the conduit, as a new article of manufacture, the bell member, said bell member comprising an elongate structure defining an enclosed flow path for said liquid drawn from said sector body to said conduit, one end of said elongate structure receiving the narrow end of the fan-shaped sector body and the other end of said elongate structure being attachable to said supporting shaft, said elongate structure having first and second sides extending radially outward from the axis of said supporting shaft, each side being configured to define a concave channel along which a radial outer rod securing the sector assembly to the supporting shaft extends, first and second generally cylindrical passages being provided in said elongate structure respectively adjacent said first and second radially extending sides, said passages extending radially with respect to the axis of said supporting shaft, each of said passages being inward of a respective one of said channels, each passage receiving an inner rod securing the sector body to said bell member, each of said passages terminating in a seat at an end of said passage, said seat being formed by a rim about the passage to define a face normal to the axis of said passage.

8. A bell according to claim 7 wherein said passage is cylindrical.

9. In a rotary disc vacuum filter of the type having a disc filter which includes a series of fan-shaped filter sector assemblies secured at intervals around a rotatable supporting shaft, each assembly including a fan-shaped sector body covered with a filter medium to provide filtering on opposing faces of the body and a bell member interconnecting passageways of the body with a conduit formed in the supporting shaft and through which a vacuum is drawn to draw liquid filtered through the filter medium along the passageways and through the bell member to the conduit, an improved sector assembly comprising:

a. a media-supporting body having an outer end portion, an inner end portion, two opposed faces, and first and second sides;
   i. said outer end portion having a greater width than said inner end portion;
   ii. said opposed faces being generally parallel to one another and having grooves to accommodate flow of filtrate during filtering operation; and
   iii. said first and second sides being formed to extend from said inner end portion to said outer end portion, each of said sides defining a concave channel with a concave slot within said channel along which channel a radial rod securing the body to a supporting shaft extends and along which slot a sector rod securing the body to a bell member extends, said channel and slot on each side extending lengthwise a substantial length of each side;

b. a bell member having first and second sides, each side formed to define a concave channel along which the respective radial rod extends and a passage along which the respective sector rod extends inward of the channel; and c. first and second sector rods which secure said body to said bell member, each of said rods detachably secured to said body and said bell member to extend along said slot of a side of said body and along said passage of a side of said bell member.

* * * * *